United States Patent [19]

Stuart et al.

[11] Patent Number: 5,618,450
[45] Date of Patent: Apr. 8, 1997

[54] TOOL HAVING INTERCHANGEABLE INDICIA MARKING ELECTRODES FOR USE IN ELECTRICAL DISCHARGE MACHINING

[76] Inventors: James P. Stuart, 852 W. Glengarry Cir., Bloomfield Village, Mich. 48301; Alberto Navarra, Jaun Ramon Jimenez-8, 08960 Sant Just Desvern, Barcelona, Spain

[21] Appl. No.: 476,195

[22] Filed: Jun. 7, 1995

[51] Int. Cl.[6] .................................................. B23H 1/04
[52] U.S. Cl. ................................................... 219/69.15
[58] Field of Search ........................... 219/69.15, 69.17, 219/69.11, 69.2, 68; 204/224 M

[56] References Cited

U.S. PATENT DOCUMENTS

| | | | |
|---|---|---|---|
| 2,909,641 | 10/1959 | Kucyn | 219/69.15 |
| 3,058,895 | 10/1962 | Williams | 219/69.15 |
| 3,087,043 | 4/1963 | Hofer | 219/69.15 |
| 3,333,081 | 7/1967 | Inoue . | |
| 3,372,099 | 3/1968 | Clifford | 219/69.15 |
| 3,375,341 | 3/1968 | Richards . | |
| 3,496,321 | 2/1970 | Lobur . | |
| 3,574,075 | 4/1971 | Eccles | 219/68 |
| 3,604,883 | 9/1971 | Dietz | 219/69.15 |
| 3,711,105 | 1/1973 | Johanson . | |
| 3,719,579 | 3/1973 | Cross et alia . | |
| 3,816,693 | 6/1974 | Braun . | |
| 3,859,712 | 1/1975 | Tramposch . | |
| 3,935,937 | 2/1976 | Tramposch . | |
| 4,041,269 | 8/1977 | Baker . | |
| 4,377,085 | 3/1983 | McDermott et alia . | |
| 4,524,259 | 6/1985 | Wolf et alia . | |
| 4,584,451 | 4/1986 | Inoue . | |
| 4,717,803 | 1/1988 | Alexandersson . | |
| 4,769,520 | 9/1988 | Balleys . | |
| 4,947,016 | 8/1990 | Puyplat | 219/69.17 |
| 5,038,012 | 8/1991 | Walter . | |
| 5,352,068 | 10/1994 | Roseliep . | |

FOREIGN PATENT DOCUMENTS

| | | | |
|---|---|---|---|
| 234332 | 4/1986 | German Dem. Rep. | 219/69.15 |
| 1710239 | 2/1992 | U.S.S.R. | 219/69.15 |

OTHER PUBLICATIONS

*McGraw–Hill Encyclopedia of Science & Technology*, 1987, vol. 6, p. 6.
*McGraw–Hill Encyclopedia of Science & Technology*, 1987, vol. 10, pp. 260–263.
H.E. Boyer & T.L. Gall, Editors, *Metals Handbook*, 1985, pp. 27–2, 27–20 –27–26, and 27–71 –27–75.
D.B. Davids, Editor *Tool and Manufacturing Engineers Handbook*, 1976, pp. 13–1 –13–13.

Primary Examiner—Geoffrey S. Evans
Attorney, Agent, or Firm—Harness, Dickey & Pierce, P.L.C.

[57] ABSTRACT

A tool is disclosed that is lockably attachable to the vertical driver of an electrical discharge machining apparatus. The tool includes a shaft having an insertion end and an electrode receptacle end. The shaft is lockably attachable to the chuck of the vertical driver. The electrode-receiving receptacle an electrode-receiving slot defined by a pair of spaced apart fixed walls, a floor, and a pair of spaced apart movable walls that function as vices to hold the electrodes in place within the receptacle. The floor of the receptacle may be planar and perpendicular with respect to the fixed and movable walls or may have a blank positioned thereon that defines an angular surface, a curved surface, or an irregular surface that conforms to the surface of the workpiece. The electrodes have indicia such as letters, numbers, or characters formed thereon. The tool finds particular application in etching printing plates.

20 Claims, 2 Drawing Sheets

TOOL HAVING INTERCHANGEABLE INDICIA MARKING ELECTRODES FOR USE IN ELECTRICAL DISCHARGE MACHINING

BACKGROUND OF THE INVENTION

1. Field of the Invention

The present invention relates to tools used in electrical discharge machining. More particularly, the present invention relates to a tool for use in electrical discharge machining having interchangeable indicia marking electrodes.

2. Description of the Relevant Art

"Electrical discharge machining" refers to a method of removing metal from a workpiece. This type of machining is frequently used in tool and die applications as well as in the production of both prototype and production parts. Electrical discharge machining is particularly suited for the forming of odd shaped holes and slots which cannot be formed simply by known production methods. An electrode, or the cutting tool, is positioned adjacent the workpiece in a liquid environment. The relationship between the tool and the workpiece is such that a gap of between about 0.001-inches and 0.004-inches is formed therebetween. The tool and the workpiece are subjected to an electrical current. Because the tool provides one of the electrodes (the cathode) and the workpiece provides the other (the anode), the electrical current provides a string of quickly recurring electrical discharges in the gap between the workpiece and the tool. The rate may be varied from about 20,000 to hundreds of thousands of discharges each second.

The area forming the gap between the workpiece and the tool is itself immersed in a tank or continuous spray of a dielectric liquid, such as a hydrocarbon dielectric, through which the current flows to form the spark. In addition, the dielectric liquid cools and rinses the workpiece.

The process of electrical discharge machining is directed to the removal of metal from the workpiece by vaporizing and melting the target area of the workpiece. By altering the gap between the workpiece and the tool as well as the applied current and voltage, the amount of material being removed can be controlled. According to known techniques, the depth of etched areas can be between 0.0001 and 0.015, and the etched areas may be between a few thousandths of an inch wide to three inches wide.

The machine used today in electrical discharge machining includes a base for holding the workpiece, a tool perpendicularly moveable with respect to the base for adjusting the distance between the tool and the workpiece, and a tank for the liquid dielectric. The tool electrode is typically made of copper, brass, tungsten, graphite, or a zinc alloy. The shape of the electrode used today is typically a wafer shape, although continuous wire electrodes are being used with increasing frequency where precision cutting is required.

As may now be understood, the electrode is critical in determining the shape and depth of the hole being formed in the workpiece. Given the criticality of this feature, a variety of inventions directed at its improvement are known. For example, U.S. Pat. No. 3,719,579, issued on Mar. 6, 1973, to D. E. Cross et al. for a TOOL HOLDER discloses a device for holding a large number of closely spaced hollow electrodes. The device finds application in either electrical discharge or electrochemical machining where the simultaneous formation of several holes in a single surface is required.

U.S. Pat. No. 4,041,269, issued on Aug. 9, 1977, to Baker for a CARTRIDGE FOR AN ELECTRICAL DISCHARGE MACHINING APPARATUS discloses an electrode-holding cartridge for use in electrical discharge machining. The electrodes are fed to the nose guide of the machine. Once in their desired position, the electrodes are clamped in the cartridge.

Finally, U.S. Pat. No. 4,717,803, issued on Jul. 5, 1988, to Alexanderson for ELECTRODE HOLDER FOR ELECTRIC DISCHARGE MACHINES, discloses a holder for releasably holding an electrode. The electrode is released from the holder through rotation of a knurled knob.

While providing improvements in electrical discharge machining, the systems represented in these patents fail to provide utility for specific applications. Particularly, these systems fail to provide a practical method of etching letters, numbers or other characters (including logos) in a workpiece. While it is often desirable to etch such indicia in a workpiece, the only known method of doing this using electrical discharge machining is to provide a carbon electrode having a pantograph that is a cutting stylus. This system is slow and requires an extensive system for movement of either the workpiece or the carbon stylus along the X- and Y-axes as is necessary to "write" the character.

Accordingly, a versatile, easy to operate method of etching indicia on a workpiece is wanting.

SUMMARY OF THE INVENTION

It is therefore an object of the present invention to overcome the disadvantages of known methods of electrical discharge machining by providing a tool that selectively holds a plurality of electrodes.

It is a further object of the present invention to provide such a tool that allows one or more of the plurality of electrodes to be readily interchanged.

Yet a further object of the present invention is to provide such a tool that includes a slot into which a plurality of four sided electrodes may be placed side-by-side.

It is a further object of the present invention to provide such a system wherein the electrodes have both male (convex) and female (concave) indicia formed thereon for marking the workpiece.

Still a further object of the present invention is to provide a tool for use with an electrical discharge machining apparatus having floor against which the tool-contacting ends of the electrodes rest that is shaped so as to position the workpiece-facing ends of the electrodes adjacent workpiece surfaces of various shapes.

Yet a further object of the present invention is to provide such a tool which utilizes interchangeable electrode-contacting blanks which form modified floors in the receptacle to mark workpieces having angular, round, or irregular surfaces.

An additional object of the present invention is to provide such a tool which utilizes electrodes formed from various electrically-conductive materials.

Yet still another object of the present invention is to provide such a tool which has particular application in the etching of letters, numbers, logos, or other characters on a printer's block in a single operation.

The present invention comprises a tool that is lockably attachable to the hydraulically-operated head of an electrical discharge machining apparatus. The tool includes a shaft having an insertion end and an electrode receptacle end. The insertion end is lockably attachable to a vertical driver such as a hydraulically-operated head. The shaft preferably has a circumferential ring defined peripherally thereabout for mating with the chuck of the head. The shaft also includes an attachment pin.

The electrode receptacle is fitted at one end of the shaft. The receptacle includes an electrode-receiving slot defined by a pair of spaced apart fixed walls, a floor, and a pair of spaced apart movable walls that function as vices to hold the electrodes in place within the receptacle.

The floor of the receptacle may be planar and perpendicular with respect to the fixed and movable walls or may be planar and perpendicular with respect to the fixed walls, while being angularly disposed with respect to the movable walls. When the first type of floor is used, the workpiece-facing ends of the electrodes are also substantially planar with respect to each other, this arrangement being desirable for use with workpieces having substantially planar surfaces to be worked.

With respect to the second type of floor which is formed by a blank positioned within the receptacle, this arrangement finds utility where the workpiece surface is angular with respect to the tool. By positioning the floor angularly with respect to the movable walls, the tool-contacting ends of the electrodes abut the angular floor, thus producing an angular arrangement of the workpiece-facing ends of the electrodes.

A third type of floor is possible, this being a non-planar floor that mirrors the shape of the workpiece surface. These shapes may be curved or irregular. For example, if the workpiece is the surface of a pipe having a round cross section, the selected floor would define a semi-circle. Once the electrodes are locked in place in the receptacle against the selected floor, the electrical discharge machining tool could be used to remove material from the curved surface of the workpiece in a single operation.

The electrodes are preferably elongated, four-sided, square or rectangular shaped elements composed of an electrically conductive material. The preferred material is copper because of its ease of forming and its long-wearing characteristics, although other materials such as graphite could as well be used. The electrodes each include a floor-contacting end and a workpiece-facing end. On the workpiece-facing end is defined indicia for machining a workpiece. The indicia may be letters, numbers, logos, or characters. In addition, the electrodes may either machine the workpiece so as to leave a female (concave) or male (convex) marking thereupon. This is accomplished by providing the workpiece-facing end with a male (convex) indicia or a female (concave) indicia. Whichever is selected, the etched figure on the workpiece will be opposite (convex or concave) the indicia on the electrode.

The electrodes may be entirely male or entirely female or some combination thereof for a given operation. In addition, in lieu of indicia-labeled electrodes, blank electrodes may selectively be used as spacers between indicia-labeled electrodes.

Other objects and advantages of the present invention will be made apparent as the description progresses.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which.

DETAILED DESCRIPTION OF THE PREFERRED EMBODIMENT

The drawings disclose the preferred embodiment of the present invention. While the configurations according to the illustrated embodiment are preferred, it is envisioned that alternate configurations of the present invention may be adopted without deviating from the invention as portrayed. The preferred embodiment is discussed hereafter.

Figure 1:
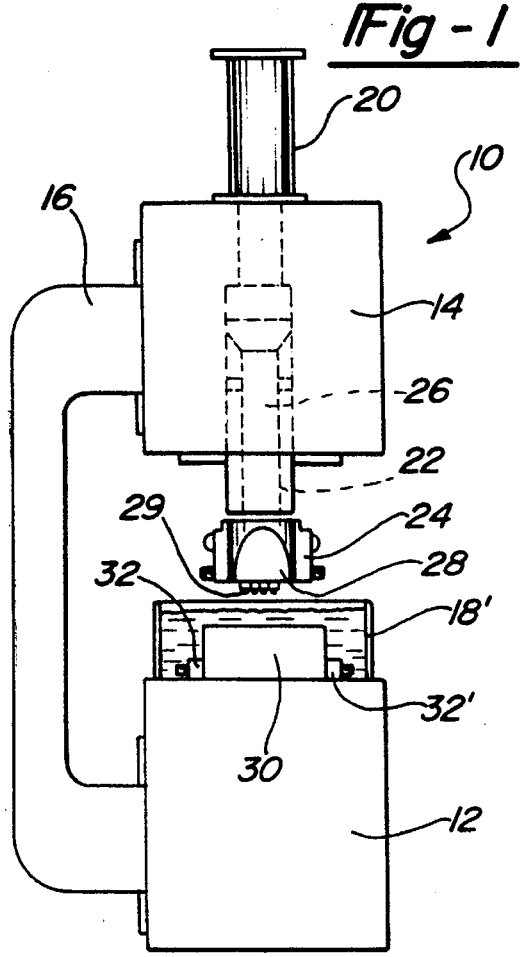
FIG. 1 is an environmental view of the electrode-holding or etching tool of the present invention fitted to an electrical discharge machining apparatus.

With reference to FIG. 1, an environmental view of an electrical discharge machining (EDM) apparatus, generally indicated as 10, is shown. The EDM apparatus 10 includes a base 12, a head 14, and an interconnecting C-frame column 16. The base 12 includes a tank 18 for a dielectric fluid, such as a dielectric hydrocarbon oil, that functions as both a cooling medium and a cleaning fluid to flush away metal particles. The tank 18 is fluidly attached to a dielectric reservoir and the fluid is circulated by means of a pump (neither shown) as is known in the art.

The head 14 includes a servosystem that includes a vertical driver 20. The driver 20 is preferably a hydraulic cylinder that is operated by an electrohydraulic valve (not shown). However, the servosystem could include a vertical driver that is an electric motor.

Figure 5:
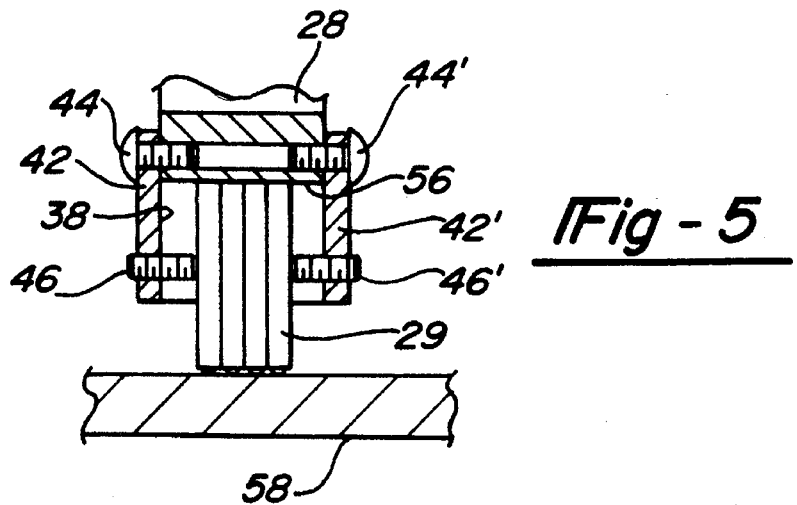
FIG. 5 is a cross sectional view of the receptacle end of the tool of the present invention showing a planar floor that is perpendicular to all of the walls and a plurality of electrodes positioned therein.
Figure 6:
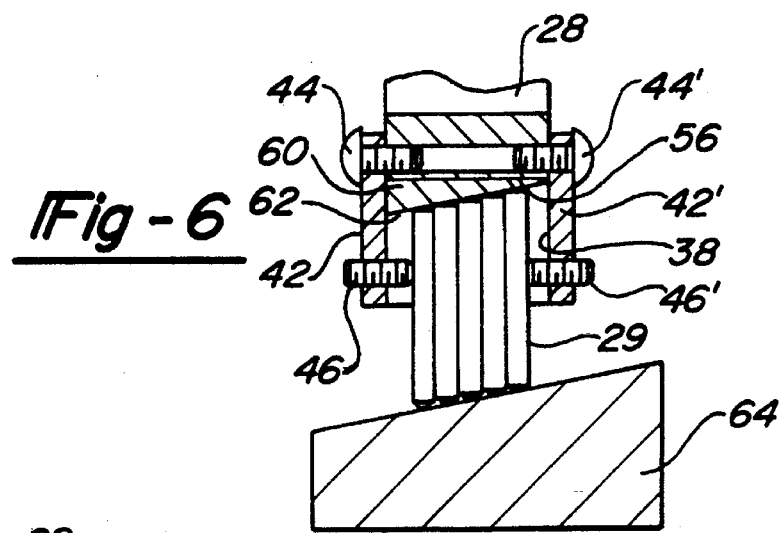
FIG. 6 is a cross sectional view similar to that of FIG. 5 but illustrating an angular blank fitted to the floor of the receptacle end of the tool of the present invention.
Figure 7:
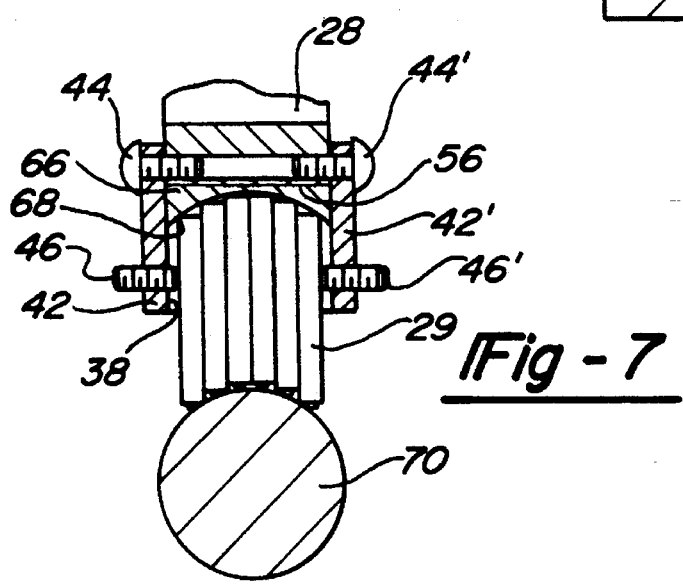
FIG. 7 is a cross sectional view also similar to that of FIG. 5 but illustrating a curved blank fitted to the floor of the receptacle end of the tool of the present invention.

The driver 20 includes a tool chuck 22 for holding an etching tool 24. The tool 24 includes a shaft 26 and an electrode receptacle 28. A plurality of electrodes 29 are lockably positioned within the receptacle 28 as will be discussed below. In operation, the driver 20 operates to move the etching tool 24 toward and away from a workpiece 30 that is removably attached to the base 12 by means such as brackets 32, 32'. The workpiece 30 is illustrated as being a generally rectangular or square shaped metal block, but may be a variety of shapes as shown in FIGS. 5 through 7.

Figure 2:
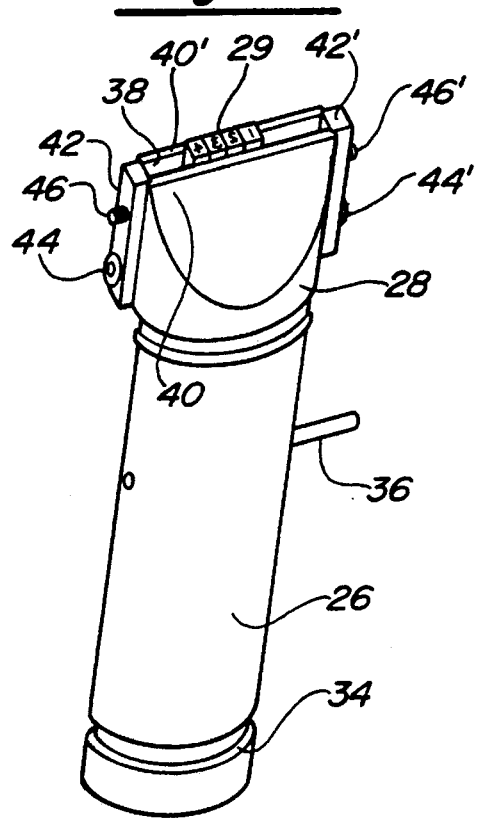
FIG. 2 is a perspective view of the etching tool of the present invention.

FIG. 2 is a perspective view of the etching tool 24 of the present invention. The tool is preferably composed of a machined, high quality steel. The tool shaft 26 and the electrode receptacle 28 are clearly shown in this view. The shaft 26 has a circumferential groove 34 defined at its base. The groove 34 provides for a region for grasping by the chuck 22. In addition, a locking pin 36 is provided for locking the etching tool 24 to the chuck 22.

The electrode receptacle 28 includes an aperture 38 defined by a pair of opposing first walls 40, 40' and a pair of opposing second walls 42, 42'. The pair of opposing first walls 40, 40' are formed integrally with the receptacle 28, which is itself preferably integral with the shaft 26 and may be cast as a single component or may be attached to the shaft 26 by welding.

The pair of opposing second walls 42, 42' are removably attached to the receptacle 28 by fasteners such as screws 44, 44'. In addition, a pair of adjusting screws such as set screws 46, 46' are provided.

The plurality of electrodes 29 are removably positionable within the aperture 38. The electrodes 29 may be composed of copper, steel, brass or other metals or may be composed of graphite, although the preferred material is copper because of its wear characteristics and its relative ease of manufacture. The electrodes 29 are positioned within the aperture 38 in a side-by-side relationship such that one electrode abuts the adjacent electrode. This arrangement serves both to provide maximum conductivity while providing minimum ease in removing and replacing one or more of the electrodes 29.

The inner side of the pair of opposing first walls 40, 40' is a planar surface, as is the inner side of the pair of opposing second walls 42, 42'. This arrangement defines the aperture 38 as being a substantially rectangular slot within which the electrodes 29 are removably positionable. Although not shown, other shapes of the slot are possible.

The set screws 46, 46' are threadably adjustable so as to lockably engage the array of electrodes 29 between the pair of opposing second walls 42, 42'. To change one or more of the electrodes 29 between etching operations, the user simply loosens one or the other of the set screws 46, 46'. Other methods of locking the electrodes 29 in place include a knurled knob, a thumbscrew or the like.

It is to be understood that while only four electrodes 29 are shown in position within the aperture 38 with gaps between the electrodes 29 and the pair of opposing second walls 42, 42', in operation electrodes 29 would be lined up side-by-side to completely fill the slot between the walls 42, 42'. FIG. 2 shows gaps between the walls 42, 42' so that the construction of the receptacle 28 may be more clearly seen.

Figure 3:
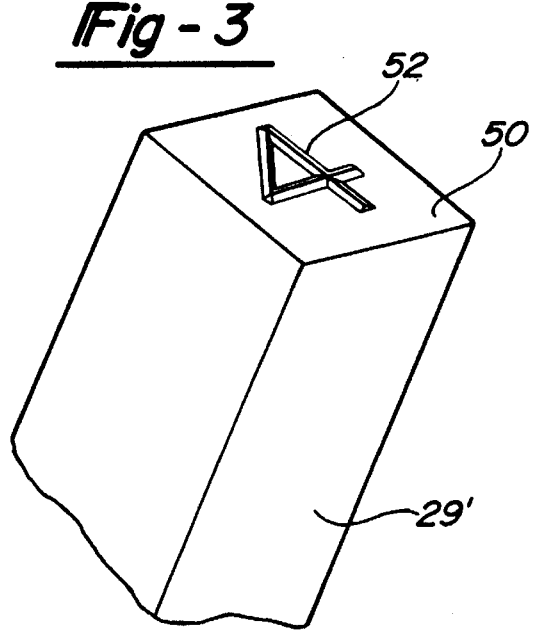
FIG. 3 is a perspective view of an electrode having a raised number formed thereon for etching a number into the workpiece.
Figure 4:
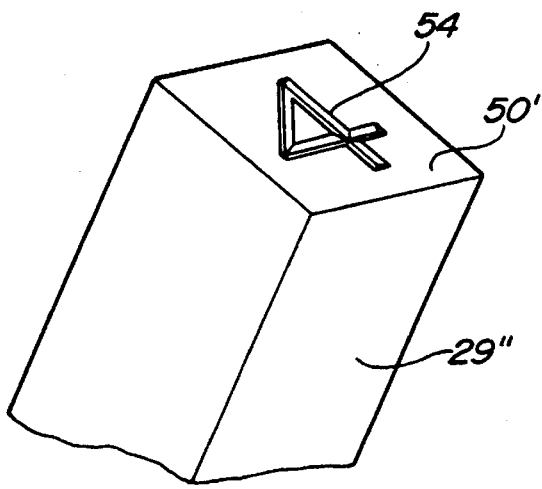
FIG. 4 is a perspective view of an electrode having a recessed number defined thereon for forming a number on the workpiece.

FIGS. 3 and 4 illustrate different electrodes, identified as 29' and 29" respectively. Both of these electrodes 29', 29" include an indicia surface, identified as 50 and 50' respectively. Each of the surfaces 50, 50' is preferably a planar surface, as illustrated.

With respect particularly to FIG. 3, a male or convex indicia 52 is shown as number "4", although other numbers and other indicia such as letters or characters might be used. The male indicia 52 is defined by a raised surface that etches a female (concave) number "4" on a workpiece (not shown).

With respect particularly to FIG. 4, a female or concave indicia 54 is shown, also as the number "4" and, again, other numbers and other indicia such as letters or characters might be used. The female indicia 54 is defined by a recessed surface that etches a male (convex) number "4" on a workpiece (again not shown).

While only one figure (the number "4") is shown on each of the surfaces 50 and 50' of the electrodes 29' and 29" respectively, it is to be understood that more than a single indicia or figure might be used. Alternatively, when it is desired to have one or more spaces between two electrodes with indicia, one or more blank electrodes (not shown) may be positioned between the two electrodes to form the desired space.

The illustrated shapes of the electrodes 29', 29" shown in FIGS. 3 and 4 are substantially square in cross section, although other shapes, such as rectangular, could as well be used. The electrodes are formed by known methods such as casting or grinding.

FIGS. 5 through 7 illustrate sectional views of the aperture end of the receptacle 28. Each of these figures illustrates a portion of the body of the receptacle 28, a plurality of electrodes 29, the pair of opposing second walls 42, 42', the screws 44, 44' which hold the walls 42, 42' to the receptacle 28, and the set screws 46, 46' which hold the electrodes 29 in place within the aperture 38. Each of these figures also illustrates a floor or base 56 into which the screws 44, 44' generally are threaded.

With particular reference to FIG. 5, the electrodes 29 are shown in position adjacent to but not in contact with a workpiece 58. The electrodes 29 are locked into the aperture 38 such that both horizontal and vertical movements are restricted. Instead, the electrodes 29 are movable only with the receptacle 28 unless intentionally removed from the aperture 38 by the user.

The floor 56 is defined by a generally planar surface against which the floor-contacting ends of the electrodes 29 rest. Accordingly, as the electrodes 29 are of substantially equal length, their workpiece-facing ends also generally define a plane. This arrangement is suitable for etching a workpiece having flat and substantially parallel upper and lower surfaces.

FIGS. 6 and 7 represent modifications of the arrangement shown in FIG. 5, these modifications being suitable for applying selected indicia to workpieces that do not have parallel, substantially flat upper and lower surfaces or do not have flat surfaces.

With particular reference to FIG. 6, the arrangement shown is substantially identical with that of FIG. 5, but includes a wedge-shaped blank 60 positioned against the floor 56. The blank 60 includes a planar upper surface 62. By utilizing the blank 60, the configuration of the surface against which the floor-contacting ends of the electrodes 29 rest is altered, as shown. Again, because the electrodes 29 are of equal length and because their floor-contacting ends abut the surface 62 as shown, the resulting configuration of electrodes 29 is useful for etching surfaces of a workpiece having non-parallel opposed surfaces, such as that on a wedge-shaped workpiece 64.

With particular reference to FIG. 7, the arrangement shown is again substantially identical with that of FIG. 5, but now includes a blank 66 having a curved upper surface 68. By utilizing the blank 66, the configuration of the surface against which the floor-contacting ends of the electrodes 29 rest is again altered, as shown, A generally concave indicia surface is formed as a result of the curved upper surface 68 of the blank 66. This arrangement is suitable for etching curved surfaces, such as that of a tube-shaped workpiece 70.

Of course, while workpieces of flat, wedge, and tube shapes are illustrated, many different blanks may be used against the floor 56 having a corresponding variety of shapes, thus making the present invention versatile enough for application to many workpieces.

With general reference to FIGS. 1 through 7, in operation the operator effects movement of the driver 20 such that the chuck 22 moves away from the base 12 so that access is gained to the etching tool 24. The operator then selects a blank for insertion into the receptacle 28 based on the type of workpiece to be etched. Where the workpiece is flat and has parallel sides as shown in FIGS. 1 and 5, no blank is used, and the electrodes 29 are inserted into the receptacle. The set screws 46, 46' are thereafter turned down so that the electrodes 29 are locked in place. Where the workpiece is wedge shaped, tube shaped, or is otherwise irregular, the operator selects the appropriate blank for positioning within the aperture 38, and the electrodes 29 are thereafter inserted. The blank may be fastened to the floor 56 or may rest against it, held in place by the fixing of the electrodes 29 by the set screws 46, 46'. Once the electrodes 29 are in place, the operator locks the workpiece in place against the base 12 and begins the etching operation. Using the etching tool 24 of the present invention, many indicia may be etched in a workpiece in a single operation. Between operations, the electrodes 29 may be easily changed.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An etching tool for use with an electrical discharge machining apparatus, the tool comprising:

an electrode receptacle having an electrode-receiving aperture defined therein, said electrode-receiving aperture having a base wall formed therein;

a row of electrodes defined by at least two electrodes removably positionable within said aperture of said electrode receptacle;

an interchangeable blank removably positionable between said base wall of said electrical receptacle and at least one of said at least two electrodes, said blank having a base wall-contacting surface and an electrode contacting surface, said surfaces being non-parallel;

means for selectively holding and releasing said at least two electrodes simultaneously with respect to said receptacle; and means for attaching said electrode receptacle to the electrical discharge machining apparatus.

2. The etching tool of claim 1, wherein said aperture is defined by a floor, a first pair of opposing walls, and a second pair of opposing walls.

3. The etching tool of claim 2, wherein said floor is perpendicular to said first pair of opposing walls.

4. The etching tool of claim 3, wherein said floor is perpendicular to said second pair of opposing walls.

5. The etching tool of claim 3, wherein said floor is planar and is positioned angularly with respect to said second pair of opposing walls.

6. The etching tool of claim 3, wherein said floor is curved.

7. The etching tool of claim 3, wherein said floor is irregularly shaped.

8. The etching tool of claim 2, wherein said means for selectively holding and releasing said at least two electrodes is defined by second pair of opposing walls being movably adjustable on said receptacle for selectively locking said at least two electrodes in place.

9. The etching tool of claim 1, wherein said at least two electrodes abut one another when positioned in said electrode receptacle.

10. The etching tool of claim 1, wherein each of said at least two electrodes has a workpiece-facing side, said workpiece-facing side of at least one of said electrodes having indicia formed thereon for etching indicia in a workpiece.

11. The etching tool of claim 10, wherein said indicia include letters.

12. The etching tool of claim 10, wherein said indicia include numbers.

13. The etching tool of claim 10, wherein said indicia include characters.

14. The etching tool of claim 10, wherein said workpiece-facing end of at least one of said electrodes includes an indicia surface and wherein said indicia is raised with respect to said surface.

15. The etching tool of claim 10, wherein said workpiece-facing end of at least one of said electrodes includes an indicia surface and wherein said indicia is recessed with respect to said surface.

16. The etching tool of claim 10, wherein said workpiece-facing end of at least one of said electrodes is blank.

17. The etching tool of claim 1, wherein said at least two electrodes are composed of copper.

18. An etching tool for use with an electrical discharge machining apparatus, the tool comprising:

a shaft for attachment to the electrical discharge machining apparatus;

an electrode receptacle fixed to said shaft, said receptacle being defined by a pair of opposite side walls, a pair of opposed end walls, and a base wall, said side walls, said end walls, and said base wall substantially defining a box having a single open end;

at least two electrodes removably positioned in said electrode receptacle; and an interchangeable blank having a base wall-contacting surface and an electrode-contacting surface, said surfaces being non-parallel, said blank being removably positionable against said base wall of said electrode receptacle.

19. A method for etching numbers, letters, characters or logos on a workpiece using an electrical discharge machining apparatus, the method including the steps of:

forming an electrode receptacle having a substantially flat base wall positioning an interchangeable blank against said base wall of said electrode receptacle, said interchangeable blank having a base wall-contacting surface and an electrode-contacting surface, said surfaces being non-parallel;

positioning at least two electrodes within an electrode receptacle of the electrical discharge machining apparatus against said electrode-contacting surface of said interchangeable blank to form a row of electrodes, each of said at least two electrodes having a workpiece-facing end, at least one of said electrodes including a number, letter, character, or a logo formed on its workpiece-facing end; and adjusting the electrical discharge machining apparatus so that said electrodes are positioned adjacent the workpiece for etching.

20. An etching tool for use with an electrical discharge machining apparatus, said tool comprising:

an electrode receptacle having a pair of opposed side walls, a pair of opposed end walls, and a base wall, said side and end walls and said base wall substantially defining an open-ended box;

an interchangeable blank being removably positionable against said base wall, said blank having a first end, a second end, and a thickness, said thickness being inconstant between said first end and said second end;

at least two side-by-side electrodes removably positionable within said open-ended box defined by said side walls and said base wall; and means for retaining said at least two side-by-side electrodes within said open-ended box.

* * * * *